United States Patent
Deivasigamani et al.

(10) Patent No.: US 11,175,681 B2
(45) Date of Patent: Nov. 16, 2021

(54) SMART PRESSURE RELIEF VALVE

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 74 days.

(21) Appl. No.: 16/865,188

(22) Filed: May 1, 2020

(65) Prior Publication Data

US 2020/0348705 A1 Nov. 5, 2020

Related U.S. Application Data (60) Provisional application No. 62/842,549, filed on May 3, 2019.

(51) Int. Cl.
| | | |
|---|---|---|
| *G05D 16/00* | (2006.01) | |
| *G05D 16/20* | (2006.01) | |
| *G05B 19/416* | (2006.01) | |
| *G08B 7/06* | (2006.01) | |
| *G08B 21/18* | (2006.01) | |

(52) U.S. Cl.
CPC ....... *G05D 16/2013* (2013.01); *G05B 19/416* (2013.01); *G08B 7/06* (2013.01); *G08B 21/182* (2013.01); *G05B 2219/37399* (2013.01)

(58) Field of Classification Search
CPC .... G05D 16/2013; G05B 19/416; G05B 7/06; G05B 2219/37399; G05B 23/027; G05B 23/0235; G08B 21/182
See application file for complete search history.

(56) References Cited

U.S. PATENT DOCUMENTS

| | | | |
|---|---|---|---|
| 7,970,494 B2 | 6/2011 | Fima | |
| 2008/0190486 A1* | 8/2008 | Lazzara | F16K 17/04 |
| | | | 137/78.5 |
| 2008/0237060 A1* | 10/2008 | Hegel | C02F 1/46109 |
| | | | 205/744 |
| 2012/0018147 A1* | 1/2012 | Niconoff | E21B 49/10 |
| | | | 166/250.01 |
| 2019/0107293 A1* | 4/2019 | Braier | F24D 19/10 |
| 2020/0263805 A1* | 8/2020 | Heizenroeder | F16K 41/066 |

* cited by examiner

*Primary Examiner* — Ojiako K Nwugo
(74) *Attorney, Agent, or Firm* — Tracy Jong Law Firm; Tracy P. Jong; Cheng Ning Jong (57) ABSTRACT

A device including: a sensor for monitoring a pressure of a fluid system to produce pressure signals over a period; and a controller configured for: receiving the pressure signals over the period; establishing an operating pressure zone corresponding to the pressure signals over the period, the operating pressure zone is representative of a normal operation zone of the fluid system, the normal operation zone defined by an area bounded by a low pressure level and high pressure level, wherein the high pressure level is disposed at a level at least at a maximum pressure of the pressure signals over the period and the low pressure level is disposed at a level at most at a minimum pressure of the pressure signals over the period.

20 Claims, 5 Drawing Sheets

SMART PRESSURE RELIEF VALVE

PRIORITY CLAIM AND RELATED APPLICATIONS

This non-provisional application claims the benefit of priority from provisional application U.S. Ser. No. 62/842,549 filed May 3, 2019. Said application is incorporated by reference in its entirety.

BACKGROUND OF THE INVENTION

1. The Field of the Invention

The present invention relates to a pressure relief valve. More specifically, the present invention is directed to a pressure relief valve configured for detecting and servicing an overpressure condition and also a leak in a fluid system to which the pressure relief valve is coupled.

2. Background Art

Mechanical pressure relief valves have been used for relieving overpressure of fluid systems for many years. With a mechanical pressure relief valve, when an overpressure event occurs, there are no indications that may be obtained from the mechanical pressure relief valve as to the event/s or causes preceding the overpressure event. Routine overpressure events can indicate serious problems in a fluid system, e.g., a fluid of the fluid system may be overheated which can cause bursting of the fluid conductors which carry the fluid which in turn can cause equipment damage, explosions of the fluid system if the overpressure is not relieved, e.g., if the pressure relief valve malfunctions, and even loss of lives. While prior art pressure relief valves may function solely to relieve overpressure, they do not offer a glimpse into the reasons behind pressure relieving events. Further, the operating pressure of fluid systems can vary from one system to another. Arbitrarily assigning a pressure relief valve setting to a pressure relief valve can have one of at least two consequences. If the relief pressure setting is disposed too high, a pressure relief valve may not relieve a damaging overpressure when it is expected to function. If the relief pressure setting is disposed too low, a pressure relief valve may be activated unnecessarily too frequently. Further, it is possible for a pressure relief valve to fail to activate when an overpressure event has occurred.

U.S. Pat. No. 7,970,494 to Fima (hereinafter Fima) discloses a system that advantageously monitors a status of a relief valve coupled to a water heater or other pressure vessel. By monitoring the relief valve, the system can limit the energy and water wasted resulting from the relief valve's failure. The system can have first and second sensors that monitor a temperature and pressure within the relief valve, and a water flow from the relief valve, respectively. If the temperature or pressure within the relief valve exceeds predetermined thresholds, or a water flow from the relief valve continues for greater than a predetermined interval, the system can restrict a flow of gas, electric current, or water to the water heater. Fima lacks a means for automatically setting the relief pressure of a pressure relief valve based on the operating pressure of the fluid system which its pressure relief valve is configured to safeguard. Fima further lacks a pressure relief valve capable of operating jointly with a fluid supply device, e.g., a water heater, which already has sensors capable of reporting readings that can be used by a pressure relief valve.

There exists a need for pressure relief valve capable of adjusting its relief pressure thresholds based on the fluid or fluid system in which the pressure relief valve operates and is used to safeguard. There further exists a pressure relief valve capable of providing tell-tale data or offering the stakeholder of a fluid system a glimpse of an overpressure in the system that causes overpressure events or a pressure relief valve indicating that the pressure relief valve has failed to act in response to one or more overpressure events such that corrective actions can be taken to eliminate the pressure relieving events and reduce the frequency of unnecessary pressure relieving events. There further exists a need for a pressure relief valve capable of using existing equipment or existing data from existing equipment to operate.

SUMMARY OF THE INVENTION

In accordance with the present invention, there is provided a device including:
 (a) a sensor for monitoring a pressure of a fluid system to produce pressure signals over a period; and
 (b) a controller configured for:
  (i) receiving the pressure signals over the period;
  (ii) establishing an operating pressure zone corresponding to the pressure signals over the period, the operating pressure zone is representative of a normal operation zone of the fluid system, the normal operation zone defined by an area bounded by a low pressure level and high pressure level, wherein the high pressure level is disposed at a level at least at a maximum pressure of the pressure signals over the period and the low pressure level is disposed at a level at most at a minimum pressure of the pressure signals over the period; and
  (iii) generating an action if a new pressure signal, obtained subsequent to the establishment of the operating pressure zone, is disposed outside of the normal operation zone.

In one embodiment, the establishing act is replaced with establishing a rate of change of pressure signals based on the pressure signals over the period and the generating act is replaced with generating an action if the magnitude of the rate of change of pressure signals exceeds a pre-determined value. In one embodiment, the generating act is replaced with generating an action if a new pressure signal, obtained subsequent to the establishment of the operating pressure zone, is disposed outside of the normal operation zone and if the magnitude of the rate of change of pressure signals obtained subsequent to the establishment of the operating pressure zone, exceeds a pre-determined value.

In one embodiment, the action includes communicating a warning to a stakeholder of the fluid system. In one embodiment, the device further includes a pressure relief valve and the action includes activating the pressure relief valve.

In one embodiment, the device further includes:
 (a) a valve that regulates a flow of fluid to the fluid system; and
 (b) a valve actuator that operates the valve, wherein the controller controllably communicates with the valve actuator.

In one embodiment, the controller is configured to transmit a status signal to a remote monitor. In one embodiment, the controller is configured to transmit a status signal over a wire. In one embodiment, the controller is configured to receive power via a portable power source. In one embodiment, the controller is configured to transmit a status signal wirelessly. In one embodiment, the device is at least partially disposed within a housing of the controller. In one embodiment, the device further includes an alarm coupled to the controller, wherein the action includes activating the alarm. In one embodiment, the alarm includes a status light. In one embodiment, the alarm includes an audio emitter. In one embodiment, the action includes opening a faucet of the fluid system to relieve the pressure of a fluid of the fluid system. In one embodiment, the device further includes a reset switch functionally coupled to the controller, such that actuating the reset switch deactivates the alarm. In one embodiment, the sensor is configured to wirelessly communicate with the controller. In one embodiment, the fluid system includes a fluid heater, wherein the controller is integrated into a circuitry of the fluid heater. In one embodiment, the controller is independent from a circuitry of the fluid system. In one embodiment, the device further includes a flow sensor.

An object of the present invention is to provide a pressure relief valve that requires no manual setting of relief pressure.

Another object of the present invention is to provide a pressure relief valve capable of providing pressure information prior to a pressure relieving event, thereby allowing the cause of the pressure relieving event to be investigated and determined.

Another object of the present invention is to provide a pressure relief valve that takes advantage of an existing sensor of a fluid system in which the pressure relief valve is coupled, thereby removing the need for a dedicated sensor.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—pressure sensor
4—flow sensor
6—controller
8—transceiver
10—power
12—actuator
14—router
16—internet
18—pressure readings
20—flow readings
22—pressure readings during normal operations
24—overly high pressure readings
26—overly low pressure readings
28—maximum pressure during normal operations
30—minimum pressure during normal operations
32—learning period
34—application and learning period
36—abnormal high pressure zone
37—abnormally high pressure limit
38—abnormal low pressure zone
39—abnormally low pressure limit
40—normal operating zone
42—fluid system, e.g., water system, e.g., water heater
44—inlet of water system
46—outlet of water system
48—shutoff valve
50—shutoff valve controller
52—water heater controller
54—communication between water heater and shutoff valve
56—communication between water heater and pressure relief valve
58—communication between pressure relief valve and shutoff valve
60—pressure relief valve
62—toilet
64—hot line faucet
66—cold line faucet
68—hot water line
70—cold water line
72—thermostatic valve
74—mechanical pressure relief valve
76—electronic pressure relief valve
78—server
80—mobile device
82—scenario
84—pump
86—bypass valve
88—valve actuator
90—building wall
92—heat exchanger
94—flow line
96—throttle valve
98—fluid system
100—indicator
102—alarm Particular Advantages of the Invention In addition to relieving pressure of a water system, e.g., a water heating system, the present pressure relief valve is capable of determining a pressure pattern of a water system that indicates a leak in the water system. Further, the present pressure relief valve can be used for determining a pressure pattern of the water system that indicates an overpressure condition in the water system.

As the present pressure relief valve is functionally connected to pressure sensor, the pressure sensor is capable of detecting a condition indicating a pressure relieving event is imminent. One or more corrective measures may be taken to prevent such an event from occurring, e.g., by opening a faucet or other valves to drain a fluid of the fluid system which the relief valve is used to safeguard to relieve the pressure of the fluid. Even if a pressure relieving event does not occur when no corrective measures are taken, the pressure patterns that indicate a pressure relieving event is likely to occur may be used as a trigger to warn the stakeholder of the system that the fluid system should be altered or improved to mitigate this potential for new pressure relieving events.

In one embodiment, the pressure relief valve includes a mechanical pressure relief valve tuned to relieve a pressure of a preset magnitude. In such an embodiment, the mechanical relief valve is used as a backup in case an electronic pressure relief valve of the fluid system fails. In one embodiment, the pressure relief valve includes only an electronic pressure relief valve having automatically adjustable high and low pressure limits. The latter scenario allows the overpressure of a fluid system to be controlled using a common pressure relief valve as the pressure relief pressure can be automatically adjusted to the fluid system.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
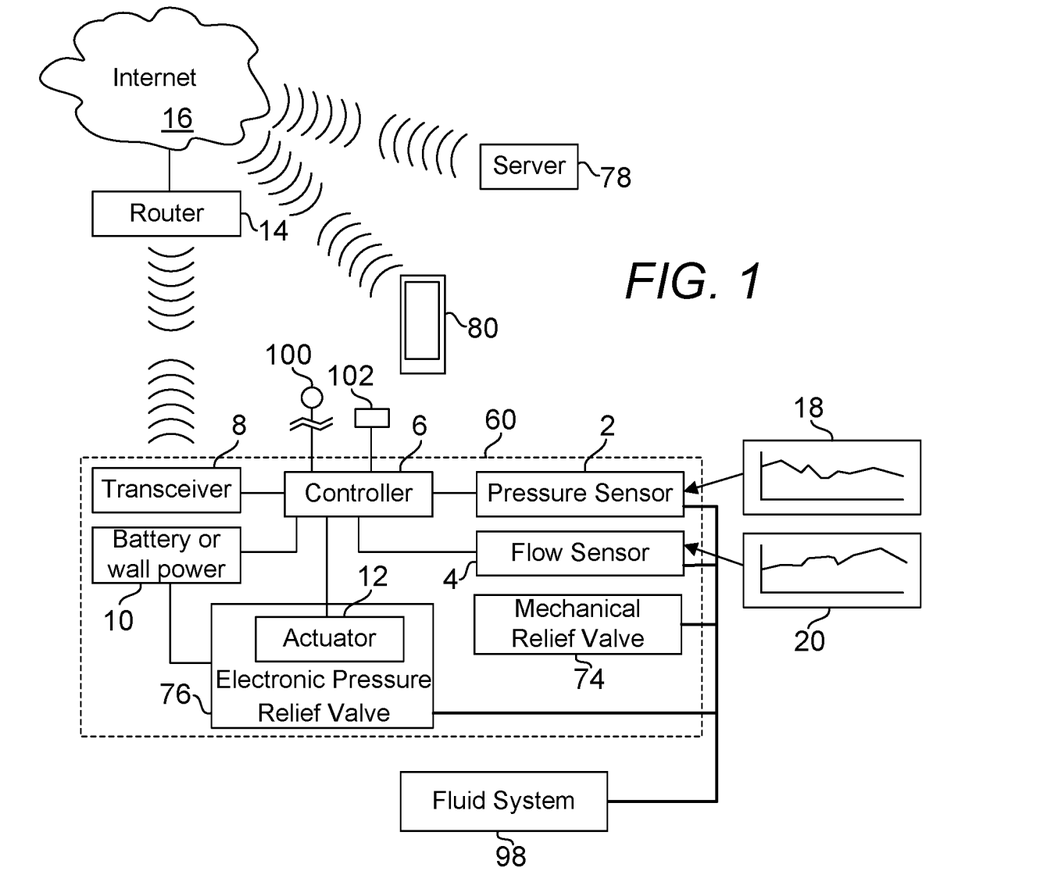
FIG. 1 is a diagram depicting a pressure relief valve adapted to carry out pressure relieving of a fluid system and also to detect and respond to a leak in the fluid system to which the valve is coupled.

FIG. 1 is a diagram depicting a pressure relief valve adapted to carry out pressure relieving of a fluid system and also to detect and respond to a leak in the fluid system to which the valve is coupled. The term "pressure relief valve" is used herein to mean a device useful for relieving pressure of a fluid system and the device may include an electronic pressure relief valve 76, a mechanical pressure relief valve 74 or both. In case a mechanical pressure relief valve 74 is available in addition to the electronic pressure relief valve 76, the mechanical pressure relief valve 74 is used as a backup in case the electronic pressure relief valve 76 fails to actuate via actuator 12 to relieve an overpressure event of a fluid in a fluid system 98 when it is required to do so. A pressure sensor 2 is functionally connected to a controller 6 where the pressure sensor 2 is configured to take pressure readings 18 of the fluid in the fluid system 98. In one embodiment, a flow sensor 4 configured to take flow readings 20 of the fluid is a provided and functionally connected to the controller 6. The controller 6 and actuator 12 are powered by wall power or a portable power source, e.g., a battery 10. Shown herein is an independent pressure relief valve. It is also possible to use existing pressure and flow valves and controller of an existing device, e.g., a water heater. A transceiver 8 aids the pressure relief valve in communicating with the outside world via a router 14 that is connected via a modem with the internet 16. In one embodiment, the controller 6 is configured to communicate with a remote monitor, e.g., a server 78 or a mobile device 80, e.g., by transmitting a status signal regarding the pressure of the fluid of the fluid system 98, an overpressure event of the fluid of the fluid system 98, and/or actuation of the actuator 12 in response to an overpressure event of the fluid of the fluid system 98. In one embodiment, an overpressure event of the fluid of the fluid system 98 is relieved by automatically opening a faucet of the fluid system 98.

Figure 2:
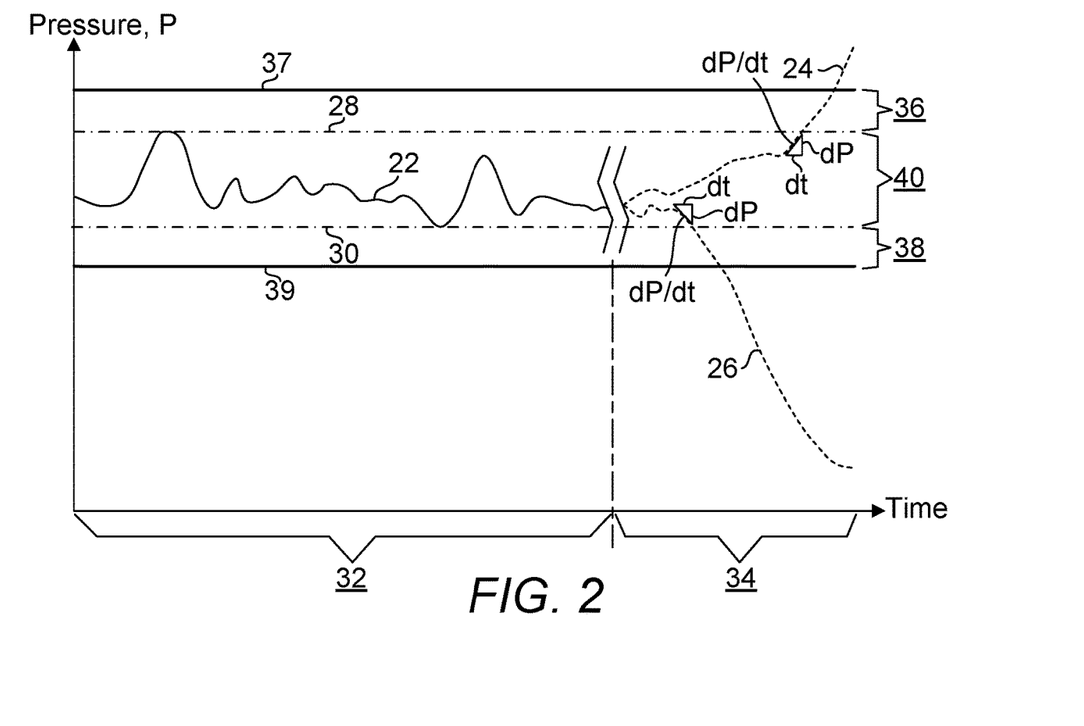
FIG. 2 is a chart depicting a first period in which a pressure relief valve learns the operating pressure of a fluid system and a second period in which the pressure relief valve is used to determine whether an anomaly has occurred.

FIG. 2 is a chart depicting a first period 32 in which a pressure relief valve learns the operating pressure of a fluid system and a second period 34 in which the pressure relief valve is used to determine whether an anomaly has occurred. The first period 32 is a period in which the fluid system is expected to establish a norm against which an anomaly is compared and identified. Note that in the first period 32, the maximum pressure detected was the pressure level labeled 28 while the minimum pressure detected was the pressure level labeled 30. The zone outlined or bounded by these two pressure levels 28, 30 are therefore termed the normal pressure zone. The area between the high pressure level labeled 28 and an abnormally high pressure limit 37 is termed abnormal high pressure zone 36 and the area between the low pressure level labeled 30 and an abnormally low pressure limit 39 is termed abnormal low pressure zone 38. The abnormally high pressure limit 37 can be established by adding a pre-defined gap of a particular magnitude or a pre-defined percentage of the high pressure level 28. Likewise, the abnormally low pressure limit 39 can be established by adding a pre-defined gap of a particular magnitude or a pre-defined percentage of the low pressure level 30 in a direction opposite that of the abnormally high pressure limit 37. It shall be noted that the overpressure condition as shown in zone 36 and the underpressure or leak condition 38 do not occur simultaneously but rather these conditions are mutually exclusive although they are both shown in FIG. 2. By establishing a normal operating zone 40 for a fluid system in which pressure readings 22 during normal operations lie, appropriate upper and lower pressure limits may be established automatically for the fluid system. These limits may alternatively be set without establishing the normal pressure zone if desired and if the normal pressure zone is already known. Any pressure behavior, observed post establishment of the normal operating zone 40, that deviates from the established normal pressure zone will be deemed unacceptable, e.g., overly high pressure readings 24 and overly low pressure readings 26. In one embodiment, the fluid system further includes a pressure relief valve and the action includes activating the pressure relief valve to relieve an excessive pressure build-up of the fluid system. If the former readings are detected, an electronic pressure relief valve may be activated such that the pressure level does not continue to rise to a level sufficient to activate a mechanical pressure relief valve of the fluid system. If the latter readings are detected, a fluid flow of the fluid system may be terminated by closing a valve. In this example, the operating parameter established in the learning phase of the pressure relief valve is the magnitude of the fluid pressure of a fluid flow of a fluid system. It shall be appreciated that the presence of a low pressure condition can indicate a leak in a fluid system coupled with a present pressure relief valve. A small leak is characterized by a drop in pressure of a fluid in the fluid system but nonetheless sustained at a consistent level over time. A growing leak however is characterized by a continuous drop in pressure of the fluid of the fluid system over time. Both of these leak conditions can be detected in the present pressure relief valve as the controller is configured to determine whether a drop in pressure has occurred over time. Therefore, it can be summarized that the present pressure relief valve can be used for monitoring a fluid system for an overpressure or a leak condition with the aid of a sensor and a controller. The sensor is useful for monitoring the pressure of a fluid of the fluid system to produce signals over a period; and the controller is configured for receiving the signals over the period, establishing an operating pressure zone corresponding to the signals over the period, the operating pressure zone being representative of a normal operation zone of the fluid system. Upon establishing the normal operation zone of the fluid system, the pressure relief valve is ready for use in responding to overpressure or leak conditions. Any new sensor signals falling outside the normal operation zone are potentially indicating an overpressure or a leak condition. In one embodiment, the sensor is a pressure sensor configured for reporting the pressure of the fluid of the fluid system. In one embodiment, the action includes communicating a warning, e.g., by creating a text message with the controller and sending the message by means of Short Messaging Service (SMS) via the transceiver 8, router 14, internet 16 to a text-enabled mobile device 80 of a stakeholder of the fluid system. The stakeholder may then decide on the next steps to take in response to this warning and may do one or more number of things. The stakeholder may simply inspect the fluid system in person especially when the anomaly may have led to potential damages to the fluid system and properties surrounding the fluid system. In cases where no properties damages and no immediate danger to lives are expected, the fluid pressure data may be examined remotely. As the fluid pressure data may be cached by the controller or communicated and cached at the server 78, the fluid pressure data taken during periods before conditions are raised, the cause for an overpressure or a leak condition may be determined.

Alternatively or additionally, pressure patterns or time derivatives of pressure readings, e.g., the rate of change of pressure readings, may be established or calculated and used as a baseline for anomaly detection in the second period 34 instead of simply the magnitude of the pressure readings. For instance, if the magnitude of the rate of change of pressure over a time period, dP/dt, exceeds a pre-determined critical pressure rise rate, where dP represents a change in pressure of the fluid system and dt represents the time period over which the change in pressure of the fluid system takes place, a warning is communicated to a stakeholder of the fluid system, indicating this behavior. In one embodiment, this behavior serves a trigger for an action that warns the stakeholder that a problem may exist in the fluid system and a further investigation for the root cause of the behavior is warranted. In one embodiment, if this behavior occurs in conjunction with the pressure reading/s falling within the abnormal high pressure zone 36 or the abnormal low pressure zone 38, the confidence that a severe overpressure or underpressure condition has occurred is increased and that an immediate response to the situation is warranted. In one embodiment, this behavior alone is used by the fluid system as a trigger to respond as if an overpressure condition or a leak condition had occurred.

Further, if flow sensor data is also available as obtained via the flow sensor 4, it can be reviewed in conjunction with the pressure data to determine whether raised conditions are urgent. For instance, if the flow sensor 4 shows that a fluid flow continues even after the fluid system has been shut down, the raised conditions may indicate a leak or damage to the fluid system that causes a leak to occur and continue.

Figure 3:
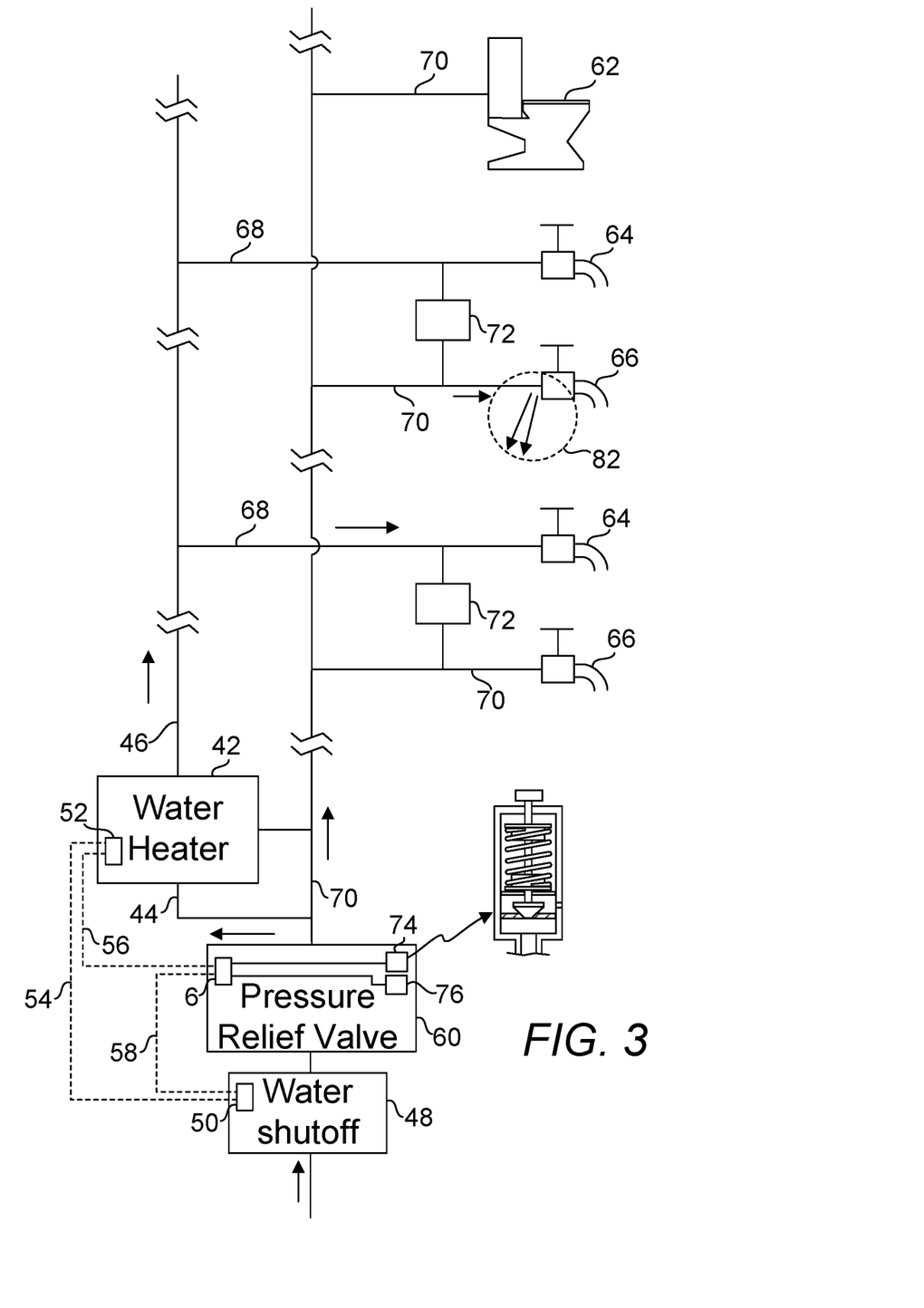
FIG. 3 is a diagram depicting a fluid system to which a pressure relief valve is coupled.

FIG. 3 is a diagram depicting a fluid system to which a pressure relief valve 60 is coupled. Here, the fluid system is a hot water system where a water heater 42 receives an inlet 44 of unheated water from a cold water line 70 and provides a hot water output in hot water line 68 to end users at faucets 64. Unheated water end users receive water at faucets 66. Thermostatic valves 72 each allows mixing of unheated water with heated water to temper the hot water line 68 before the mixture reaches an end user. The cold water line further supplies water to a toilet 62. In the embodiment shown, the system further includes a valve 48 that regulates a flow of fluid to the fluid system, a valve actuator that operates the valve, wherein the controller 50 controllably communicates with the valve actuator as a function of the new signal. In this embodiment, a mechanical pressure relief valve 74 is provided in addition to an electronic pressure relief valve 76. In one embodiment, the controller 50 is configured to receive wall power. In another embodiment, the controller 50 is configured to receive power via a portable power source, e.g., a battery. In one embodiment, the controller 50 is configured to transmit a status signal over a wire to one or more devices outside of the pressure relief valve 60, e.g., an indicator 100, e.g., a flashing light, etc. In another embodiment, the controller is configured to transmit a status signal wirelessly to devices outside of the pressure relief valve 60, e.g., via a Short Message Service (SMS) message, email, etc. If a water heater 42 already has a pressure sensor, the pressure relief valve 60 can be configured to obtain pressure readings from the water heater 42 and does not need its own pressure sensor. Computations related to monitoring of the readings and decision making for any actions that need to be taken based on the readings can be made locally in controller 6, controller 52 of the water heater or controller 50 of the shutoff valve 48 or remotely in remote servers as shown elsewhere herein. In one embodiment, the pressure relief valve 60 is at least partially disposed within a housing of controller 6, making the pressure relief valve 60 compact in its function and requires no interactions with other devices locally. Communication 54 between water heater 42 and shutoff valve 48, communication 56 between water heater 42 and pressure relief valve 60 and communication 58 between pressure relief valve 60 and shutoff valve 48 can be made possible either by wire or wirelessly.

In one embodiment, the system further includes an alarm 102 functionally coupled to the controller 6, wherein the controller 6 is further configured to activate the alarm 102 to catch a stakeholder's attention to a potential overpressure or leak problem. In one embodiment, the alarm includes a status light. In one embodiment, the alarm includes an audio emitter to further serve as an alert broadcaster to a stakeholder. In one embodiment, the system further includes a reset switch functionally coupled to the controller, such that actuating the reset switch deactivates the alarm. An alarm is deactivated when the stakeholder has been informed and the alarm is no longer needed. In one embodiment, the sensor 2 is configured to wirelessly communicate with the controller 6 if the sensor 2 is not disposed within the same device as the controller 6. In one embodiment, the fluid system is a fluid heater 42, wherein the functionalities of controller 6 is integrated into a circuitry of the fluid heater 42, i.e., in controller 52. In one embodiment, the controller 6 is a component independent from a circuitry of the fluid system 42. An overpressure condition in the fluid system is detected and serviced by the relief valve 60. In the present pressure relief valve, a leak condition as shown in scenario 82 can be detected by the pressure relief valve 60. If a catastrophic leakage is determined to have occurred, e.g., if the rate of pressure drop exceeds a pre-determined threshold, shutoff valve 48 can be activated to prevent and contain prevent property damage during to this catastrophic leakage. In the event that an overpressure condition or a leak condition has been detected, the fluid system is turned off. For instance, if a water heater 42 is part of the fluid system, the water heater 42 will cease to produce heated water.

Figure 4:
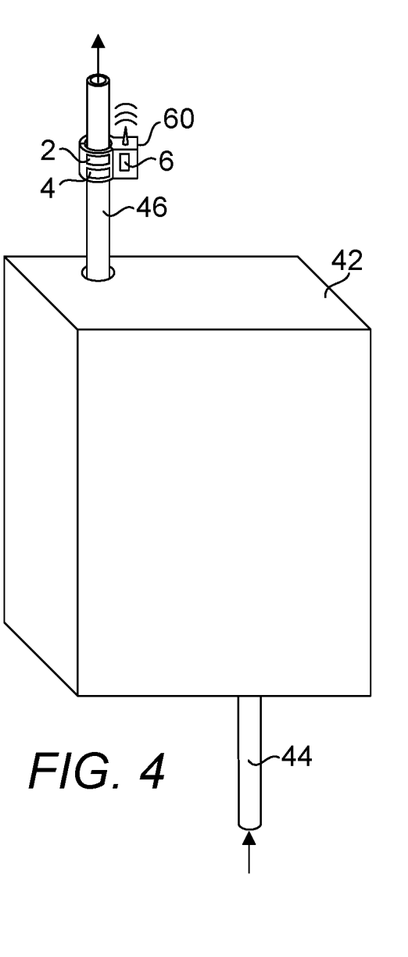
FIG. 4 is a diagram depicting a water system to which a pressure relief valve is externally coupled.
Figure 5:
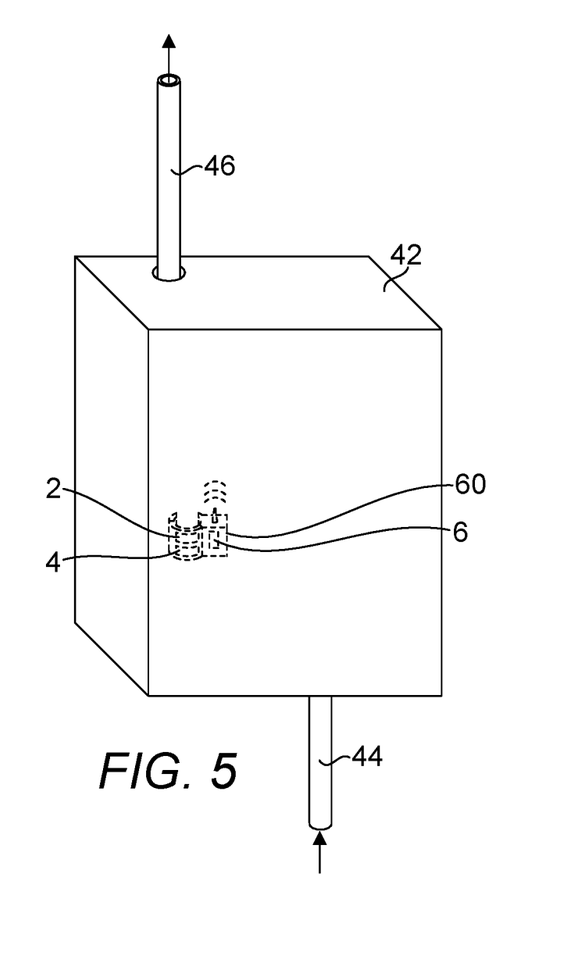
FIG. 5 is a diagram depicting a water system to which a pressure relief valve is internally coupled.

FIG. 4 is a diagram depicting a water system to which a pressure relief valve 60 is externally coupled to a fluid system, e.g., a water heater 42. Here, it shall be seen that the pressure relief valve 60 is disposed outside of the enclosure of the water heater 42 and on the outlet 46 of fluid system. The pressure relief valve 60 may include its own pressure sensor 2, flow sensor 4 and controller 6 and can function as a pressure relief valve even without any interactions with or inputs from the water heater 42. In one embodiment, the controller 6 of the pressure relief valve 60 is configured to interact with one or more sensors, e.g., pressure sensor and flow sensor, of the water heater 42, removing the need for the pressure relief valve 60 to have those sensors of its own. FIG. 5 is a diagram depicting a water system to which a pressure relief valve 60 is internally coupled. Here, all of the required sensor/s already exist in the water heater 42. The controller can be the same controller used for the water heater 42. If a mechanical and/or electronic pressure relief valve is not already available for the water heater 42, they can be provided and installed in the water heater 42. In the embodiment shown in both FIGS. 4 and 5, the pressure relief valve 60 includes a flow sensor. In an embodiment not shown, the pressure relief valve 60 relies on a water heater for a flow sensor. Armed with a flow sensor, it is possible to determine the usage of the fluid system. For instance, flow rates of the fluid system may be correlated to a variety of equipment in a fluid system. For instance, if flowrates of a particular size and duration can be determined to correspond to one or more toilets, e.g., by observing flowrates over durations, the adequacy of the number and/or placement of bathrooms in a building can be studied. As an example, flows of about 1.6 gallons over a duration of about 10 seconds may be attributed to toilet flushes while flows of over about 10 gallons over a duration of over a duration of about 2 minutes may be attributed to showers or baths.

Figure 6:
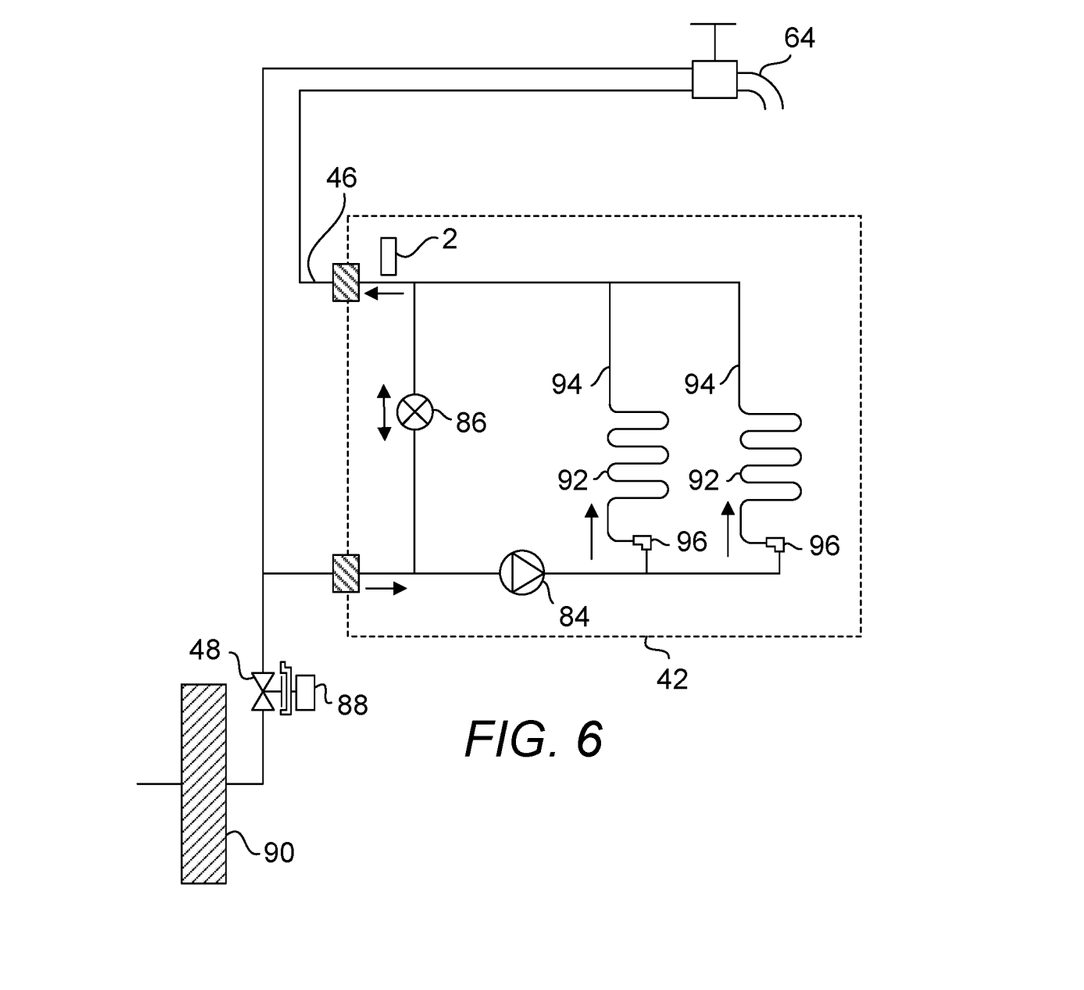
FIG. 6 is a diagram depicting the use of a pressure relief valve including a pressure sensor and a shutoff valve for detecting a hot side leak and/or a cold side leak.

FIG. 6 is a diagram depicting the use of a pressure relief valve including a pressure sensor and a shutoff valve for detecting a hot side leak and/or a cold side leak of a heating system. Depicted in FIG. 6 is a water heater 42, e.g., one installed in a building. The water heater receives unheated water from a supply through the building wall 90 and supplies heated water to a point of delivery, e.g., faucet 64. For sake of simplicity and clarity, only one example of a water heater is shown. However, the same strategy shown herein for detecting a hot side leak and/or a cold side leak is applicable to water heaters of other configurations. The water heater 42 includes two heat exchangers 92 disposed in parallel, each heat exchanger 92 receiving a flow via a throttle valve 96 before merging into a flow from flowlines 94 that may be supplied at the water heater outlet 46 or recirculated through the bypass valve 86 that is also disposed in parallel to the heat exchangers 92. In one mode of the water heater 42, the unheated water flow may bypass the heat exchangers 92, at least partially to flow through the bypass valve 86 to be mixed with effluent from at least one of the heat exchangers 92. A main shutoff valve 48 is typically disposed inside a building on or near an interior wall 90. A pump 84 is disposed upstream of the throttle valves 96 and just past a fluid conductor on which the bypass valve 86 is disposed. A pressure sensor 2 is disposed at the outlet 46 of the water heater 42. The shutoff valve 48 may be manually operated or it may be coupled with a valve actuator 88 for a motorized operation. Here, the valve actuator 88 controls whether unheated water can be supplied to the water heater 42 and to faucet 64. It is not always apparent where a leak occurs when it does occur. It is also beneficial to recognize a leak early so that it does not lead to a large problem later. Disclosed herein is a method for narrowing down the location of a leak to whether the leak has occurred in the hot side or the cold (unheated) side. In this embodiment, in determining whether a leak has occurred at the hot side or cold side, the shutoff valve 48 is closed along with all of the valves in the water heater 42, i.e., the bypass valve 86 and throttle valves 96. If a pressure decay is observed in pressure sensor 2, a hot side leak is deemed to have occurred. A service personnel can then focus on locating the leak in the hot side or the fluid conductors between the valves in the water heater 42 and point of use, e.g., the faucet 64 in this case. However, if no pressure decay is found, then valves 86 and 96 are opened. If a pressure decay is found, then a cold side leak is deemed to exist. A hot side leak is not exclusive of a cold side leak, i.e., a hot side leak can occur concurrently with a cold side leak. Therefore, even if a hot side leak has been identified to exist, one should also look for a cold side leak. If a cold side leak is determined to be present, a service personnel should focus on locating the leak in the cold side or the fluid conductors between the valves in the water heater 42 and the shutoff valve 48 and the entire cold fluid conductor up to the point of use, e.g., the faucet 64 in this case. It shall be noted that in detecting a hot side leak and/or a cold side leak, no additional plumbing has been required with the present method. Further, if exists, a pressure trend, e.g., a growing pressure trend seen in pressure sensor 2, can be reported to a stakeholder of the water heater 42 before a catastrophic relief valve event can occur so that a corrective action can be taken. Yet further, in any water heater or flow line equipped with a flow sensor, flow usages and events, e.g., kitchen faucet usages and toilet flushes can be estimated and flow data can be gathered for further analysis.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A device comprising:
   (a) a sensor for monitoring a pressure of a fluid system to produce pressure signals over a period; and
   (b) a controller configured for:
      (i) receiving said pressure signals over said period;
      (ii) establishing an operating pressure zone corresponding to said pressure signals over said period, said operating pressure zone is representative of a normal operation zone of the fluid system, said normal operation zone defined by an area bounded by a low pressure level and a high pressure level, wherein said high pressure level is disposed at a level at least at a maximum pressure of said pressure signals over said period and said low pressure level is disposed at a level at most at a minimum pressure of said pressure signals over said period; and
      (iii) generating an action if a new pressure signal, obtained subsequent to the establishment of said operating pressure zone, is disposed outside of said normal operation zone.

2. The device of claim 1, wherein said establishing act is replaced with establishing a rate of change of pressure signals based on said pressure signals over said period and said generating act is replaced with generating an action if the magnitude of said rate of change of pressure signals exceeds a pre-determined value.

3. The device of claim 1, wherein said generating act is replaced with generating an action if a new pressure signal, obtained subsequent to the establishment of said operating pressure zone, is disposed outside of said normal operation zone and if the magnitude of the rate of change of pressure signals obtained subsequent to the establishment of said operating pressure zone, exceeds a pre-determined value.

4. The device of claim 1, wherein said action comprises communicating a warning to a stakeholder of the fluid system.

5. The device of claim 1, further comprising a pressure relief valve and said action comprises activating said pressure relief valve.

6. The device of claim 1, further comprising:
   (a) a valve that regulates a flow of a fluid to the fluid system; and
   (b) a valve actuator that operates said valve, wherein said controller controllably communicates with said valve actuator.

7. The device of claim 1, wherein said controller is configured to transmit a status signal to a remote monitor.

8. The device of claim 1, wherein said controller is configured to transmit a status signal over a wire.

9. The device of claim 1, wherein said controller is configured to receive power via a portable power source.

10. The device of claim 1, wherein said controller is configured to transmit a status signal wirelessly.

11. The device of claim 1, wherein said device is at least partially disposed within a housing of said controller.

12. The device of claim 1, wherein said action comprises opening a faucet of said fluid system to relieve the pressure of a fluid of said fluid system.

13. The device of claim 1, further comprising an alarm functionally coupled to said controller, wherein said action comprises activating said alarm.

14. The device of claim 13, wherein said alarm comprises a status light.

15. The device of claim 13, wherein said alarm comprises an audio emitter.

16. The device of claim 13, further comprising a reset switch functionally coupled to said controller, such that actuating said reset switch deactivates said alarm.

17. The device of claim 1, wherein said sensor is configured to wirelessly communicate with said controller.

18. The device of claim 1, wherein the fluid system comprises a fluid heater and said controller is integrated into a circuitry of said fluid heater.

19. The device of claim 1, wherein said controller is independent from a circuitry of the fluid system.

20. The device of claim 1, further comprising a flow sensor.

* * * * *